United States Patent
Downing

(10) Patent No.: US 10,934,828 B2
(45) Date of Patent: Mar. 2, 2021

(54) GAS AND SAND SEPARATOR

(71) Applicant: Donald Randall Downing, San Antonio, TX (US)

(72) Inventor: Donald Randall Downing, San Antonio, TX (US)

(*) Notice: Subject to any disclaimer, the term of this patent is extended or adjusted under 35 U.S.C. 154(b) by 8 days.

(21) Appl. No.: 16/133,315

(22) Filed: Sep. 17, 2018

(65) Prior Publication Data
US 2019/0085676 A1     Mar. 21, 2019

Related U.S. Application Data

(60) Provisional application No. 62/562,603, filed on Sep. 25, 2017, provisional application No. 62/559,231, filed on Sep. 15, 2017.

(51) Int. Cl.
| | |
|---|---|
| *E21B 43/38* | (2006.01) |
| *B01D 45/16* | (2006.01) |
| *E21B 43/08* | (2006.01) |
| *B01D 21/26* | (2006.01) |

(52) U.S. Cl.
CPC .............. *E21B 43/38* (2013.01); *B01D 45/16* (2013.01); *E21B 43/08* (2013.01); *E21B 43/086* (2013.01); *B01D 21/265* (2013.01); *B01D 2221/04* (2013.01); *B01D 2265/00* (2013.01)

(58) Field of Classification Search
CPC ....................................................... E21B 43/38
See application file for complete search history.

(56) References Cited

U.S. PATENT DOCUMENTS

| | | | | |
|---|---|---|---|---|
| 1,554,835 | A * | 9/1925 | Barrett | E21B 43/38 166/105.5 |
| 1,578,720 | A * | 3/1926 | Derby | F04B 47/00 166/105.5 |
| 1,628,900 | A * | 5/1927 | Neilsen | E21B 43/38 166/105.5 |
| 2,748,719 | A * | 6/1956 | Wells | E21B 43/38 166/105.5 |
| 5,295,537 | A * | 3/1994 | Trainer | E21B 43/38 166/105.1 |
| 5,314,018 | A * | 5/1994 | Cobb | E21B 43/38 166/105.1 |
| 5,553,669 | A * | 9/1996 | Trainer | B01D 29/114 166/105.1 |
| 5,662,167 | A * | 9/1997 | Patterson | B01D 21/0003 166/105.1 |
| 6,182,751 | B1 * | 2/2001 | Koshkin | E21B 43/127 166/105.5 |
| 6,382,317 | B1 * | 5/2002 | Cobb | E21B 43/38 166/105.5 |

(Continued)

*Primary Examiner* — Kipp C Wallace
(74) *Attorney, Agent, or Firm* — Robert L. McRae; Gunn, Lee & Cave, P C.

(57) ABSTRACT

A dual-stage sand and gas separator for use within a wellbore of a fluid producing well is disclosed. During sand separation, fluid is ported into a vortex housing and across a vortex cup which imparts a vortex motion on the fluid to separate solids from the fluid. Some of the solids are filtered by a sand filter screen, while heavier solids are diverted down hole by a diverter plate. The fluid pass internally through the vortex cup into the gas separation housing. During the gas separation phase, a sump is created by the transfer tubing and gas is separated from the fluid and ported away from the tubing.

13 Claims, 6 Drawing Sheets

(56) References Cited

U.S. PATENT DOCUMENTS

| | | | |
|---|---|---|---|
| 7,713,035 B2* | 5/2010 | Ford | F04B 53/20 |
| | | | 417/430 |
| 10,107,088 B2* | 10/2018 | Stachowiak | E21B 43/121 |
| 2010/0258297 A1* | 10/2010 | Lynde | E21B 37/00 |
| | | | 166/105.1 |

* cited by examiner

GAS AND SAND SEPARATOR

This is a utility patent application claiming priority to U.S. Provisional Patent Application No. 62/559,231 filed Sep. 15, 2017 and U.S. Provisional Patent Application No. 62/562,603 filed Sep. 25, 2017, both of which are incorporated herein by reference.

BACKGROUND

Field of the Invention

The present invention relates to oil and gas wells. Specifically, the present invention relates to a multi-stage sand and gas separator for placement within a wellbore of a well to separate sand and gas from fluid. In one aspect of the present invention, sand and sediment are separated from fluid by imparting a vortex on the fluid and passing the fluid though a sand/sediment filter. In another aspect of the present invention, a sump is formed as the fluid flows up-hole, and the gas is ported away from the fluid.

The present invention reduces sediment and sand from entering fluid intake through normal production cycle of the well, and employs a system that does not need to use packers or related filtering technology. The present invention is easy to install and imparts a unique fluid path to accomplish separation and filtration, and does so without restricting flow of the fluid. The present invention accomplishes both sand and gas separation from fluid in a way that has never been done before.

SUMMARY OF THE INVENTION

As used herein, the term "up hole" should be understood to mean above, upward, and generally toward the surface within the wellbore, and the term "down hole" should be understood to mean below, downward, and generally further away from the surface within the wellbore.

The present invention comprises a vortex housing in which sand and solids are separated from fluids. Within the vortex housing is a vortex cup which has a central aperture there through. The central aperture through the vortex cup, which is in communication with the production tubing adjacently above it, allows fluid to flow through the vortex cup and upwards during operation of the pump jack of the well. The vortex cup expands below its neck portion into a wider diameter body that is slightly smaller than the internal diameter of the vortex housing. The vortex cup comprises a plurality of grooves extending from the lower neck portion of the vortex, down the body of the vortex cup to the bottom. The grooves are indented within the surface, but do not extend all the way through the vortex cup. The grooves extend downward in a helical pattern. These grooves, as fluid passes around them, as will be described later, create a vortex movement of the fluid, which aids in separating sand and other solids from the fluid.

The vortex housing has internal threads along its upper portion and connects to a tubing connector, which has corresponding external threads on both ends thereof, which is attached to a tubing collar. On the lower (downhole) end of the vortex housing, a similar tubing connector has external threads which mate with internal threads of the lower end portion of the vortex housing. The lower tubing connector has external threads on the other end thereof to connect to lower casing of the well. This lower tubing connector allows for the passage of solids downhole away from the fluid during operation of the sand and gas separator of the present invention.

A sand diverter system is disposed below the vortex cup, and is threadedly attached thereto. Specifically, the sand diverter comprises a sand filter screen which is threadedly attached to the lower end of the vortex cup, and defines a channel there through that corresponds to the production tubing and the aperture through the vortex cup to allow the passage of fluids. The sand filter screen is a tube that is threaded along its external surface of its upper and lower portions, with a body that comprises a plurality of slits or holes along its external circumference which extend through the tubing into the internal channel. The slits allow for the passage of fluid into the fluid intake stream without allowing larger particles and solids such as sand to pass through, thus providing a sand filter screen filter to filter sand and other solids from the fluid. The sand filter screen is threadedly attached to the bottom of the vortex cup, and is attached to a sand diverter downhole. It is contemplated within a typical production operation that the sand filter screen could be approximately one to ten feet long, and preferably approximately two feet long. However, each well is unique, and it is contemplated that shorter or longer sand filter screens may be needed for any given operation, depending on the amount of solid content, the well, and other geological conditions that may exist.

The sand diverter provides a platform to attach a diverter plate. The diverter plate extends from the sand diverter downwards and has a diameter that substantially dissects the diameter of the vortex housing. The sand diverter is thicker than the diverter plate, but slightly narrower than the vortex cup, defining a narrow channel between the vortex housing and the bottom of the well for solids to pass downhole. This channel or slot widens where the diverter plate extends downward beyond the sand diverter.

In operation, during down stroke of the well by the pump jack of the well, the fluid is substantially static within the separator. However, upon uptake of the fluids during up-stroke of the well, fluid is sucked in through a plurality of slots along the upper portion of the vortex housing, and travels downward along the side of the tubing within the vortex housing and across the vortex cup. The fluid, which has not been filtered from sand and other solids at this point, passes across the vortex cup. As this occurs, the grooves of the vortex cup impart a vortex motion on the fluid, causing the fluid to spin at a high rate. During this process, the fluid continues down across the sand filter screen and the sand filter screen allows some fluid in, but filters the sand. As the vortex motion slows, the remaining sediments along with the fluid pass down below the sand filter screen, and within the channel or slot defined by the sand diverter and the diverter plate and the sidewall of the vortex housing, going downward towards the bottom of the well.

Upon upstroke of the well by the pump jack the fluid is sucked around the diverter plate to the other side of the vortex housing, prior to entering the lower tubing connector. The solids, however, including the sand, are heavier and fall to the bottom of the well bore and are blocked from entering the fluid stream by the diverter plate. The filtered fluids enter an aperture within the sand diverter, which is in fluid communication with the internal tube of the sand filter screen, which further collects more sand as the fluid passes up hole. The fluid continues on each upstroke through the production tubing and into the gas separation phase of the present invention.

The gas separation phase of the present invention comprises a gas separator housing which is in fluid communication with the production tubing of the well and the vortex housing of the present invention. The gas separator housing houses the elements of the gas separation unit of the present invention. A tubing collar is connected to an upper connector of the vortex housing. Alternatively, the tubing collar can be located further up hole, and is connected to the casing of the well. The tubing collar has internal pin by pin threads and mates with external threads of the casing or upper tube connector of the vortex housing. Along its upper end, along its internal surface, the tubing collar has a lip or shoulder. The tubing collar has external threads on the upper end along its external surface.

The tubing collar houses a lower tube plate, which rests along the internal shoulder of the tubing collar. The lower tube plate has an aperture that is in fluid communication with a lower transfer tube. The lower transfer tube is attached to the lower tube plate, surrounding the aperture, which allows fluid to pass through the lower tube plate and into the lower transfer tube. The external threads of the tubing collar mate with internal threads of the gas separator housing to connect the tubing collar to the gas separator housing such that the lower transfer tube is disposed within the gas separator housing.

The gas separator of the present invention further comprises a ported upper connector. The ported upper connector has a top portion which has external threads, and a lower portion which also contains external threads. Substantially in the center of the external portion of the upper connector, there is a port along its side, which extends into a chamber. The chamber houses a ball and seat socket. The ball and seat socket are disposed within the chamber such that the ball is on top, or up hole, and the socket is below. The ball rests on the socket. A hex plug has external threads, and a hole through the center, and the external threads mate with internal threads of the chamber to maintain the ball and seat valve within the chamber.

Beside the chamber where the ball and seat valve reside, an aperture is disposed longitudinally through the upper connector, and an upper transfer tube extends downward from the upper connector. The upper transfer tube surrounds the aperture of the upper connector, and allows for the flow of fluid upward. The upper connector is threadedly attached along its lower external threads to mating with internal threads along the upper end of the gas separator housing. It should be noted that none of the elements of the gas separator portion of the present invention are directly connected to the tubing, therefore these parts remain static during pumping operations, and a sump is formed within the gas separator housing.

As fluid along with gas, after being filtered through the vortex and sand filter, flow up hole towards the surface, the fluid and gas enter the gas separator housing through the lower tube plate, and the lower transfer tube. The heavier fluid then is allowed to fall down into the gas separator housing and into the upper transfer tube, where it is sucked up towards the surface during upstroke of the well. The gas is lighter, and moves within the gas separator housing to the top thereof. As high static pressure exists during the down stroke of the well, a high pressure surge is thrown down into the gas separator housing, which forces the lighter gas through the hole in the hex plug. The gas unseats the ball from the seat, and is forced through the port and therefore is ported out of the port in the side of the upper connector.

DETAILED DESCRIPTION OF THE INVENTION

Referring to FIGS. 1 through 5, the dual gas/sand separating system of the present invention is disclosed. The separation system of the present invention is a two stage separation system. The vortex separator downhole in the well bore of the present invention operates to separate sand and other solids from the fluid being pumped in one phase of the invention. In the other phase of the present invention, the gas separating system up hole, closer to the surface, operates to separate and port gas from the fluid, allowing cleaner and more pure fluid to reach the surface of the well.

The Vortex Stage

Figure 1:
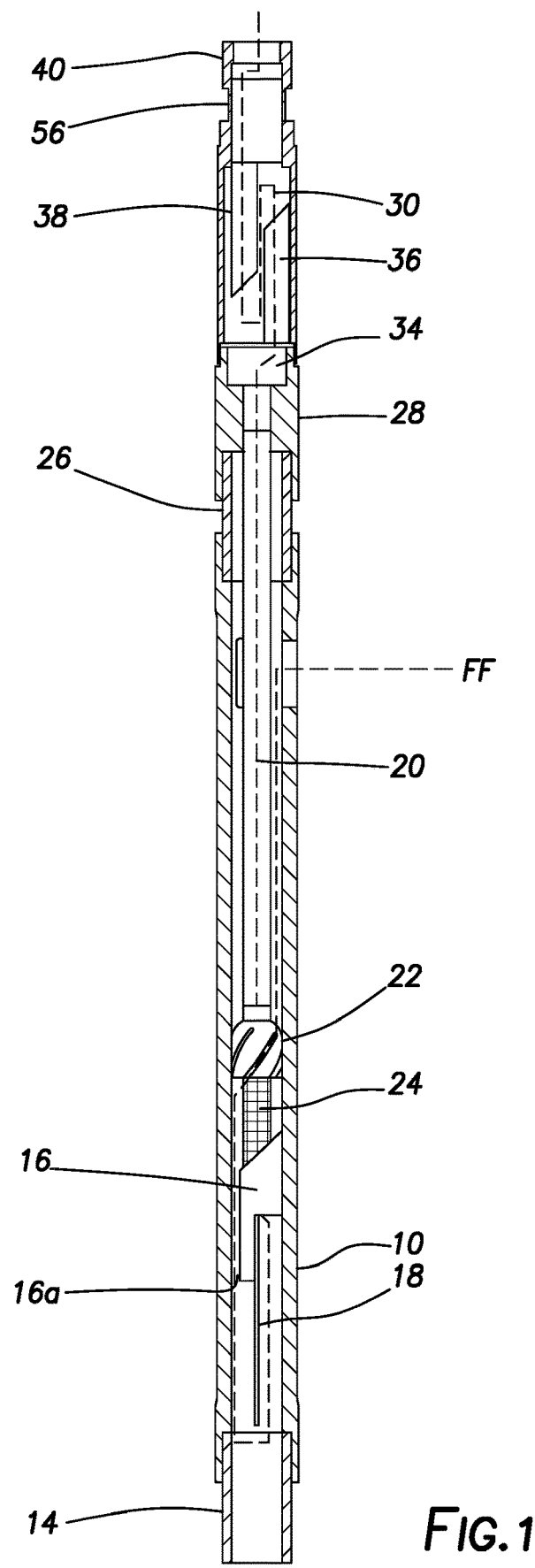
FIG. 1 is a sectional side view of the sand and gas dual separation system of the present invention.
Figure 2:
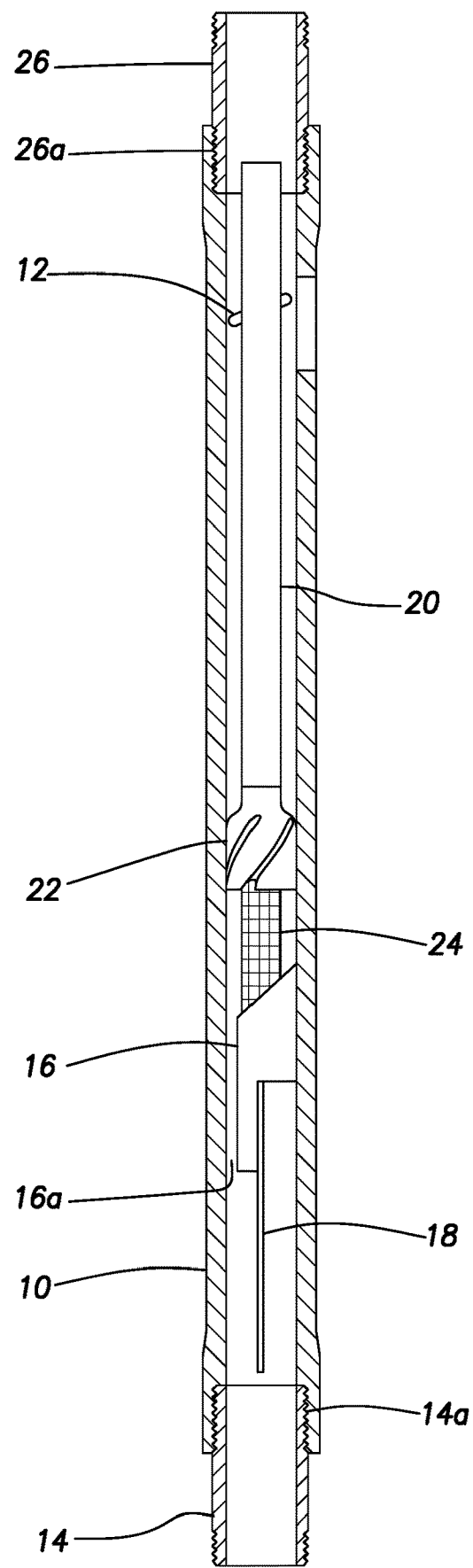
FIG. 2 is a sectional view of the vortex housing with the vortex cup and sand diverter mechanisms shown.

Referring particularly to FIG. 1 and FIG. 2, in conjunction with the sand separation aspect of the present invention, the components thereof are all housed within a vortex housing 10. The vortex housing 10 is designed to be connected to the casing of the well (not shown). As shown and described herein, a tubing connector 14 connects vortex housing 10 to the well casing (not shown) downhole. Up hole, a tubing connector 26 connects the top portion of the vortex housing 10 to either the well casing (not shown), or as shown in FIG. 1 to a tubing collar 28. However, it should be understood that direct connection of the tubing collar 28 to the vortex housing 10 may be possible without the use of tubing connector 26. Also, other forms of connectors may be used in lieu of tubing connector 14 and tubing connector 26 to connect vortex housing 10 to the casing of the well.

Referring to the lower tubing connector 14 as shown in FIG. 2, vortex housing 10 has internal threads along the lower end thereof which mate to external threads of tubing connector 14 to mate and thereby attach vortex housing 10 to tubing connector 14. Tubing connector 14, as will be described hereinafter, allows for the passage of sediments, sand and solids downhole, away from the filtered fluid into the bottom well. Along the upper end of vortex housing 10, the upper tubing connector 26 is threadedly attached by having external threads which mate with internal threads of the upper portion of vortex housing 10. Tubing connector 26 further has external threads that engage with internal threads of tubing collar 28. However, it is possible for tubing connector 26 to threadedly engage with existing casing of the well, in situations where the gas separator apparatuses need to be located further up hole from the vortex phase.

Below the internal threads along the upper end of the vortex housing 10, a plurality of slots 12 are disposed along the circumference of the vortex housing 10. The plurality of slots 12 are helically disposed, extending downward in an angular direction, and permit fluid to pass within vortex housing 10 from the outside of the vortex housing 10. It is contemplated by this stage of the invention (known as the vortex stage), that production tubing from the existing well, such as production tubing 20 will be disposed within the interior of the vortex housing 10, and will attach to the present invention. Specifically, production tubing 20 is disposed within vortex housing 10, at a predetermined location within the well bore, specifically where filtration of sand and other solids is desired.

A vortex cup 22 is threadedly attached to production tubing 20. Vortex cup 22 comprises an upward neck portion which is of a diameter sufficient such that its internal surface on its upper portion, which contains internal threads, will engage and tightly mate with the external threads of production tubing 20. There is a longitudinal channel all the way through the middle of vortex cup 22, which allows for the passage of fluid from within the vortex cup 22 to production tubing 20. Vortex cup 22 shoulders outward in diameter, and downward to define a greater diameter body than the neck portion. This body portion of vortex cup 22 comprises a plurality of grooves. The grooves are indented within the vortex cup 22. The grooves are indented within the outer surface of the vortex cup 22, but do not extend all the way and to the channel of vortex cup 22. The grooves extend downward on the body of vortex cup 22 in a helical pattern.

Immediately downhole from the vortex cup 22 there is a sand filter screen 24. Sand filter screen 24 is a substantially tubular structure. It comprises an internal cavity which is in fluid communication with fluid passing through the external side of the sand filter screen 24, and internally from the sand diverter 16. Sand filter screen 24 comprises a series of slits or tiny mesh like holes along its external surface, passing into the inner channel to allow fluid flow while filtering the sand away from the fluid. Therefore, the plurality of slits within sand filter screen 24 are of sufficient size to allow fluid to pass through sand filter screen 24 without allowing substantial solids such as sand or sediment, thus filtering the sand away from the fluid. Sand filter screen 24 is threaded along its external surface on its upper portion to engage with internal threads of the lower end of vortex cup 22.

Sand filter screen 24 is also threaded along its external surface along its end portions and mates with internal threads of sand diverter 16. Sand diverter 16 is disposed within vortex housing 10, and is of slightly smaller diameter than vortex housing 10. Sand diverter 16 is substantially semi cylindrical shaped on one side, meaning that approximately half of sand diverter 16 is conformed to be in relatively tight communication with the interior surface vortex housing 10. However, a second side, extending vertically, is substantially flattened, and longer, extending downward, than the semicircular side. This extended portion of sand diverter 16 provides a platform for attaching a diverter plate 18.

On the outside of sand diverter 16 opposite from the substantially cylindrical side, a slot 16a is defined by the gap between the flattened end of the sand diverter 16 and the cylindrical shape of vortex housing 10. This channel, as it extends downward, increases in volume as diverter plate 18 extends downward beyond sand diverter 16. Diverter plate 18 is designed to extend just within the inner diameter of the vortex housing 10 sufficient to block sand from entering the intake stream of the fluid. Sand diverter 16 and diverter plate 18 are located above tubing connector 14. As set forth above, tubing connector 14 connects to downhole casing, and is designed to channel the filtered solids downhole away from the fluid.

The Gas Separation Stage

Figure 5:
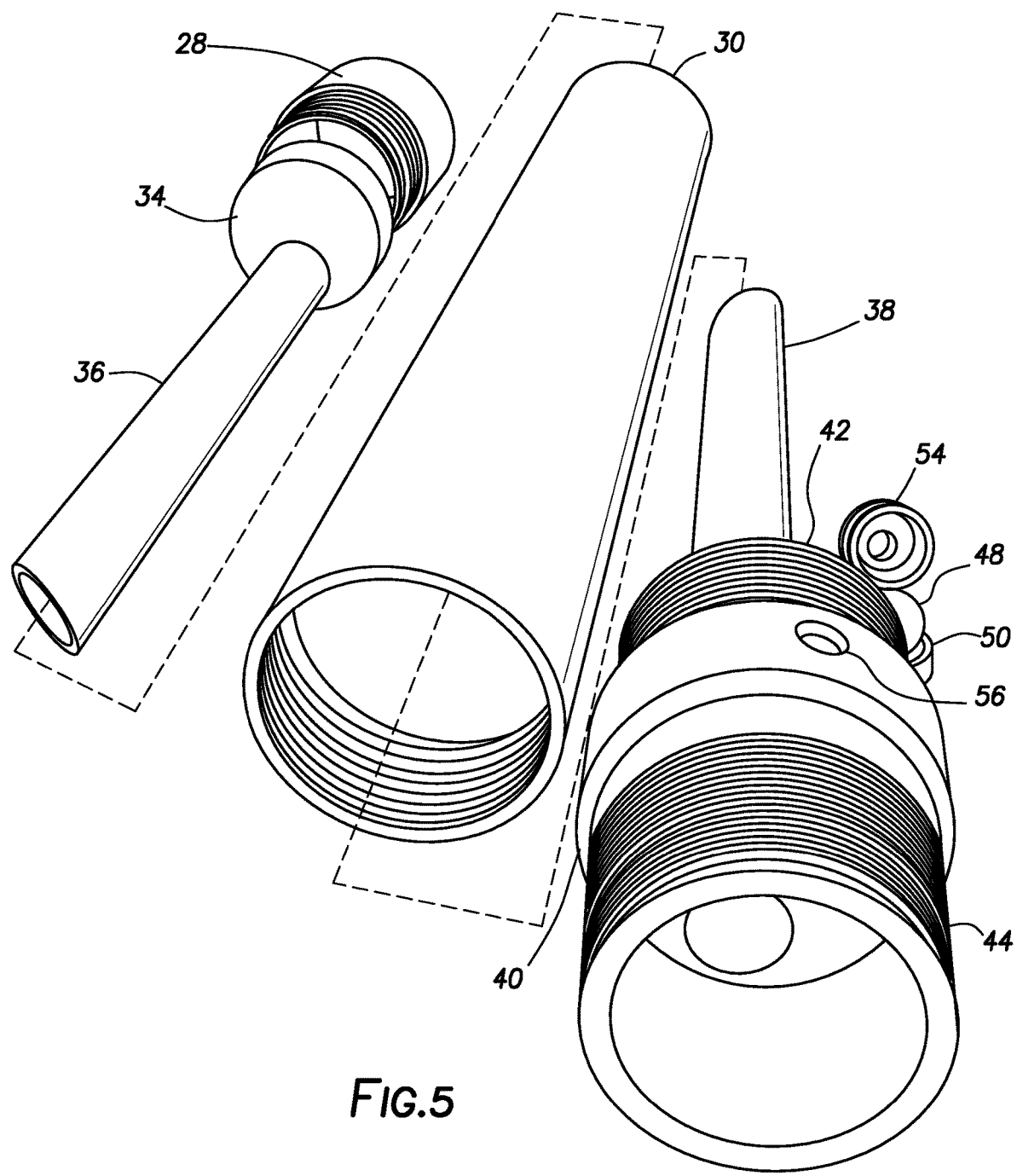
FIG. 5 is an elevated perspective view of the up hole side of the components of the gas separator of the present invention.

Referring to FIGS. 1, 3A, 3B, 4 and 5, the portion of the present invention known as the gas separation stage is disclosed. As previously disclosed, tubing connector 26 is threadedly engaged to connect vortex housing 10 and tubing collar 28. Tubing collar 28 has internal threads along its lower portion which mate with external threads of tubing connector 26. Along its upper portion, tubing collar 28 comprises external threads 28a which engage with internal threads 30a of gas separator housing 30. Along the internal circumference of tubing collar 28, a lip (not shown), extends slightly internally. This lip holds a lower tube plate 34 in place during operation of the well. Lower tube plate 34 comprises an aperture there through which allows for the passage of fluid. A lower transfer tube 36 is adjacently attached to lower tube plate 34 and extends upward therefrom. As shown in FIG. 5, the lower transfer tube 36, which is in fluid communication with the aperture of lower tube plate 34 is placed at a position that is offset and not centrally located with respect to the substantially cylindrically shaped lower tube plate. This alignment allows transfer tube 36 and transfer tube 38 to remain disposed substantially side-by-side within gas separator housing 30.

Tubing collar 28 is threadedly engaged with gas separator housing 30 such that lower transfer tube 36 extends upward and is disposed within gas separator housing 30. Along the internal circumference of gas separator housing 30, along the lower portion thereof, there is a shoulder indentation (not shown) which engages the top portion of lower tube plate 34 to restrain movement during production of the well.

Figure 3A:
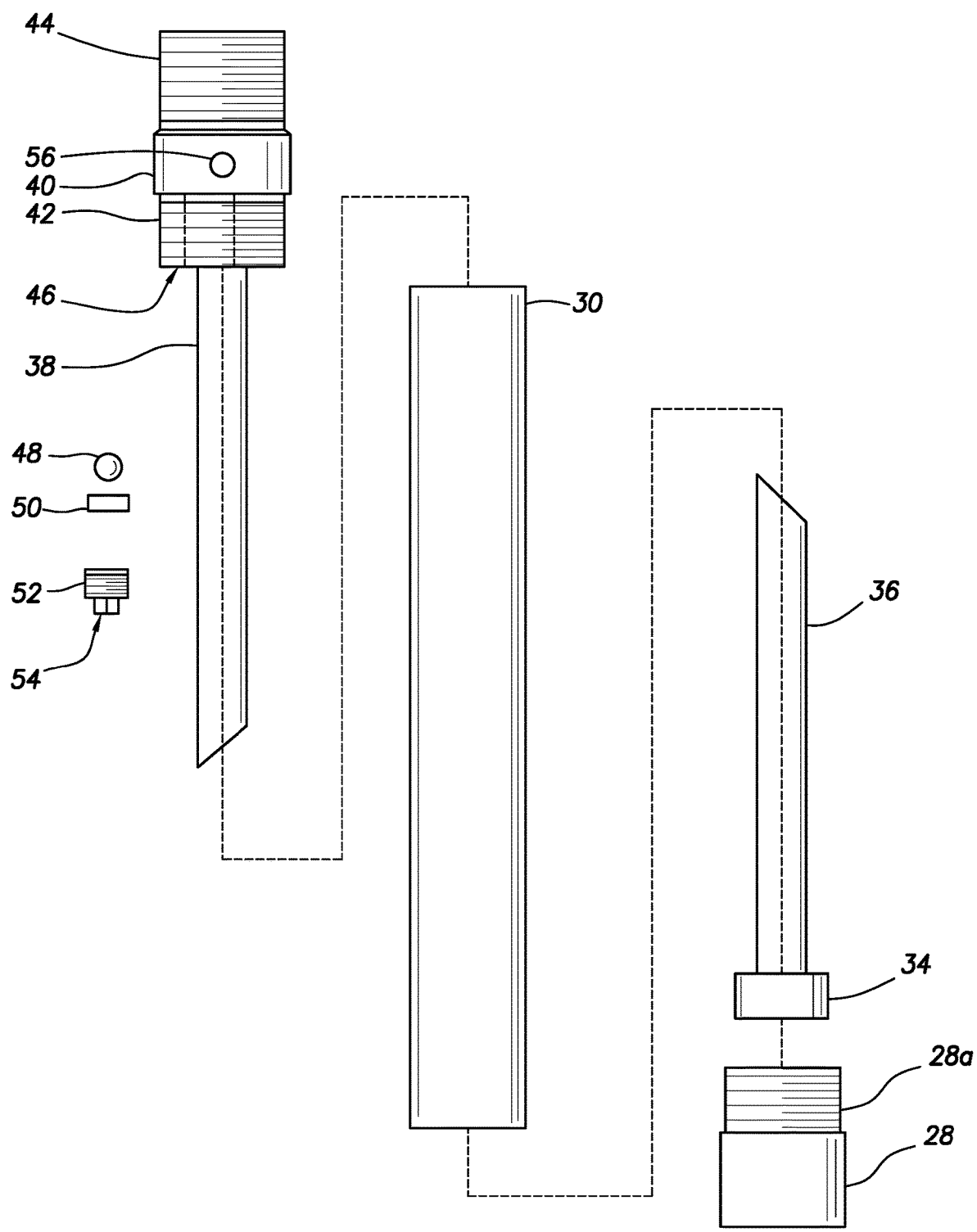
FIG. 3A is an exploded side view of the gas separator housing along with the tubing collar, lower tube plate, lower transfer tube, upper transfer tube and upper connector along with the ball and seat valve.
Figure 3B:
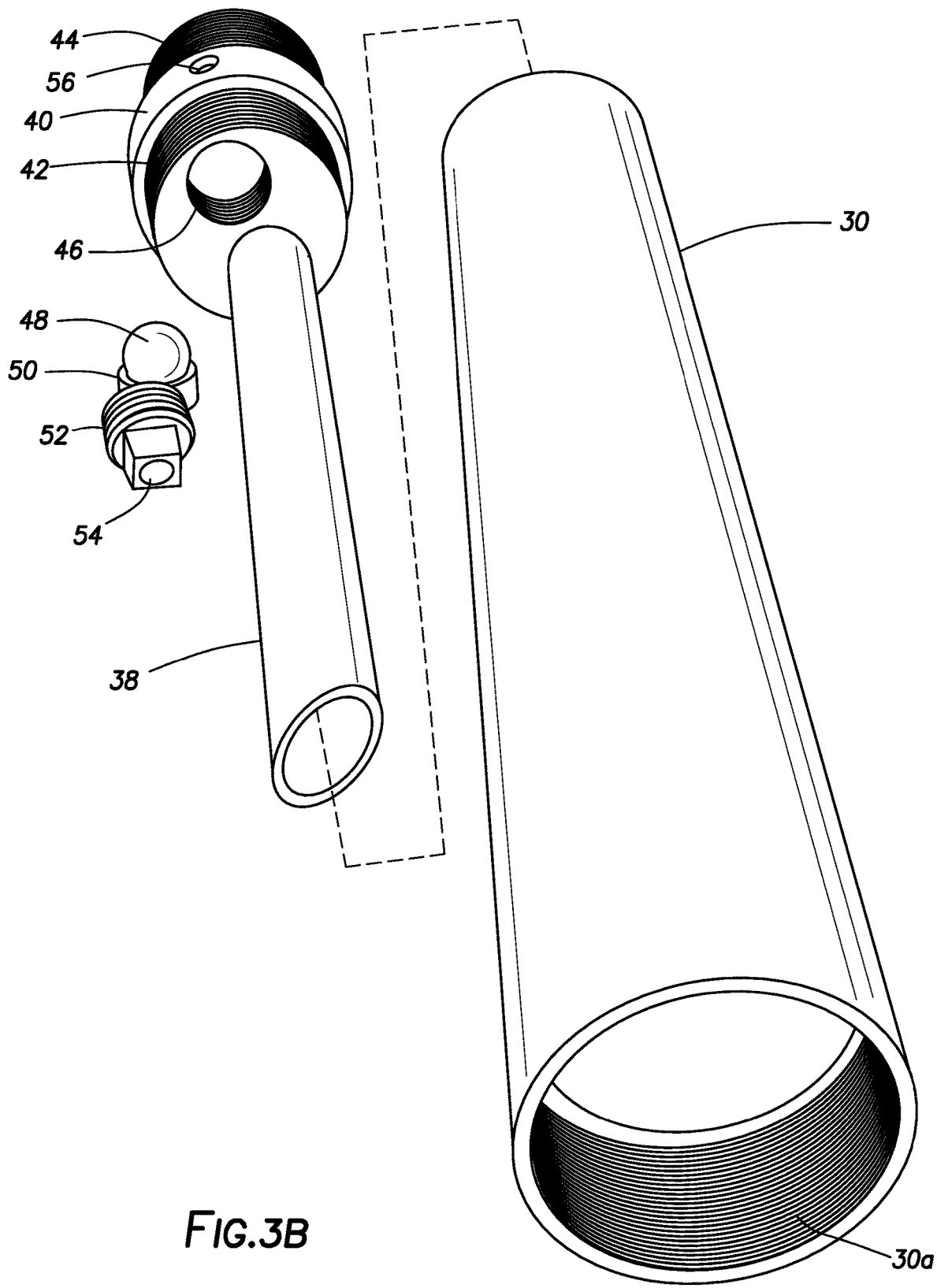
FIG. 3B is an elevated perspective view of the downhole side of the upper connector, gas separator housing, and ball and seat valve.
Figure 4:
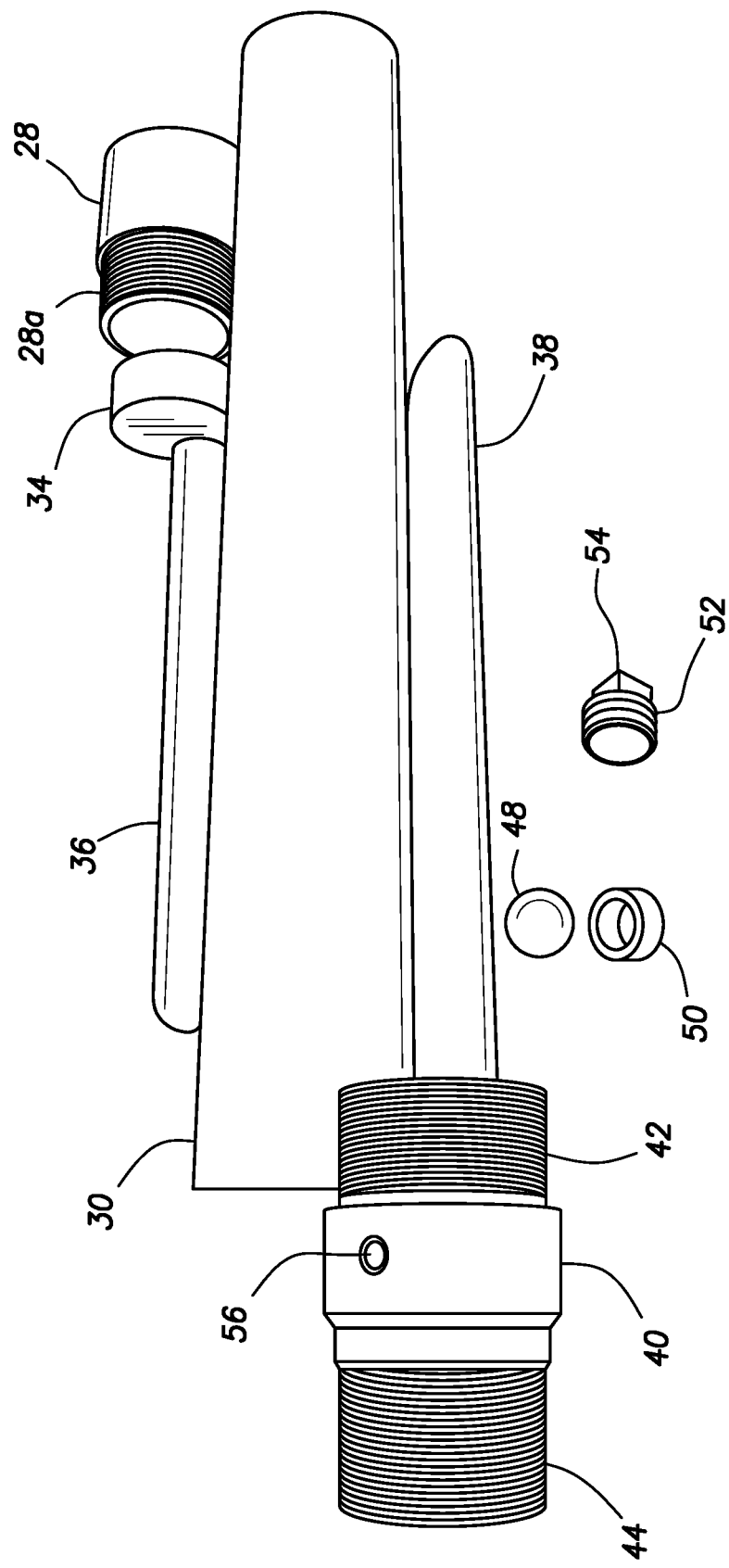
FIG. 4 is a side elevational view of the gas separator components of the present invention.

Referring to FIGS. 3A, 3B, 4 and 5, an upper connector 40 is substantially cylindrically shaped with external threads 44 along its upper portion, and external threads 42 along its lower portion. The center portion of upper connector 40 is not threaded, and comprises a port 56. Port 56 extends into an interior chamber 46. As best shown in FIG. 3B, beside chamber 46, there is another aperture extending longitudinally all the way through upper connector 40. Upper transfer tube 38 is attached to upper connector 40, encasing the longitudinal aperture, and providing fluid communication between upper transfer tube 38 and upper connector 40. Upper connector 40 is threadedly engaged with internal threads of gas separator housing 30 along its top end (not shown but substantially the same as internal threads 30a), and results in upper transfer tube 38 extending downward into gas separator housing 30 such that lower transfer tube 36 and upper transfer tube 38 are substantially side-by-side within the gas separator housing 30.

Referring to FIG. 1, the fluid flow across the present invention is indicated by fluid flow line FF. As the pump jack (not shown) of the well is in a down stroke operation, the fluid is substantially static and no fluid is moving, but the gas is ported out of the gas separator housing 30. However, on the upstroke of the pump jack, the fluid moves in the direction disclosed in FIG. 1 by fluid flow line FF. Specifically, fluid flows into the plurality of fluid entry slots 12, within vortex housing 10, and down towards vortex cup 22. As the fluid crosses vortex cup 22, the grooves therein create a vortex of the fluid, which causes a substantial portion of the solids, such as sand and sediment, to separate out and be sucked into sand filter screen 24. The remaining fluid, once filtered, along with the existing heavier sediments falls down through slot 16a between sand diverter 16 and the inner surface of vortex housing g10, and fall further down into the larger volume of slot 16a where diverter plate 18 extends from sand diverter 16. Upon further upstroke, the sand and heavier sediments are not allowed to cross diverter plate 18, and settle through tubing connector 14 and down to a solid collecting area of the well (not shown). The filtered fluids are sucked into the channel through sand diverter 16, and past within sand filter screen 24, wherein remaining solids are caught by sand filter screen 24 before passing through vortex cup 22.

The fluid travels upward through production tubing 20, where it enters the tubing collar 28, and into lower transfer tube 36 through lower tube plate 34. The sand—filtered fluid extends upward out of lower transfer tube 36 and into gas separator housing 30 where it settles therein. During this phase of the invention, the heavier fluid falls toward the bottom portion of the gas separator housing 30, while the lighter gas remains above the fluid and a high pressure environment is created. The fluid further travels to upper transfer tube 38 upon upstroke of the pump jack. On downstroke of the well, the high pressure is surged on the gas, and forces the gas to the chamber 46 through a hex plug 52 which has a hole there through 54. Hex plug has external threads which engage with internal threads of chamber 46. Within chamber 46 there is a ball 48 and a seat 50, creating a ball and seat valve. As the gas is forced through hex plug 52, the high pressure unseats ball 48 from the seat 50, and is ported out of port 56 to remove the gas from the fluid. Thus, the present invention combines sand and sediment separation and gas filtration in a single system as has never been done before.

Although the invention has been described with reference to specific embodiments and working examples herein, this description is not meant to be construed in a limited sense. Various modifications of the disclosed embodiments as well as alternative embodiments of the invention will become apparent to persons skilled in the art upon reference to the description of the invention. It is therefore contemplated that the appended claims will cover such modifications that fall within the scope of the invention.

I claim:

1. A multiple stage sand and gas separator comprising:
   a sand separation stage comprising:
      a vortex cup within a vortex housing attached to a production tube up hole of said vortex cup;
      a sand diverter system attached to said vortex cup downhole thereof and comprising a sand filtering screen adjacent said vortex cup and a sand diverter adjacently attached to a lower portion of said sand filtering screen, and defining a channel with a sidewall of said vortex housing;
      a plurality of slots along a circumference of an upper portion of said vortex housing for entry of fluids and solids; and
   a gas separation stage comprising:
      a tube plate disposed within a tubing collar and resting along an internal lip thereof,
      a lower transfer tube extending upward from said tube plate, said lower transfer tube being in fluid communication with an aperture within said tube plate,
      a gas separator housing receiving said tubing collar along a lower end thereof;
      an upper connector comprising a channel which houses a ball and seat valve in communication with a port of said upper connector extending outward into said gas separator housing,
      an upper transfer tube in fluid communication with an aperture extending through said upper connector and beside said ball and seat valve, and
      wherein said gas separator housing receives said upper connector.

2. The multiple stage sand and gas separator as set forth in claim 1 wherein said vortex cup comprises a vertical aperture through its central portion, thereby defining an internal channel wherein a portion of an interior surface of said channel comprises internal threads to threadedly connect said vortex cup to said sand diverter and said production tube.

3. The multiple stage sand and gas separator as set forth in claim 2 wherein said vortex cup comprises a plurality of grooves on an outer surface extending in a helical pattern downward, and
   wherein said vortex cup is in close communication with said vortex housing, said grooves imparting a vortexing motion of fluid.

4. The multiple stage sand and gas separator as set forth in claim 3 wherein:
   said sand diverter comprises an aperture through its central portion, thereby defining an channel comprising internal threads to threadedly connect to said vortex cup, said aperture corresponding to said aperture of said vortex cup, and allowing fluid there through and through said vortex cup; and
   said sand diverter comprises a diverter plate extending downward to prevent sand from entering said aperture of said sand diverter.

5. The multiple stage sand and gas separator as set forth in claim 4 wherein said sand filtering screen comprises a plurality of slots to block sand from entering said aperture of said sand diverter.

6. The multiple stage sand and gas separator as set forth in claim 5 wherein said diverter plate extends downward from said sand diverter, and defines a channel between said diverter plate and a sidewall of said vortex housing.

7. The multiple stage sand and gas separator as set forth in claim 6 wherein said slots of said vortex housing extend downward in a helical pattern to receive fluid there through.

8. The multiple stage sand and gas separator as set forth in claim 7 further comprising a lower connector threadedly connected to said vortex housing, and an upper connector threadedly connected to said vortex housing.

9. The multiple stage sand and gas separator as set forth in claim 8 further comprising a hex plug with an aperture through its central portion for allowing gas to said ball and seat valve, said hex plug threadedly engaging said slot of said upper connector.

10. The multiple stage sand and gas separator as set forth in claim 9 wherein said upper transfer tube and said lower transfer tube are substantially beside each other within said gas separator housing.

11. A sand separator for use within a wellbore comprising:
    a vortex cup within a vortex housing and adjacently attached to a production tube up hole of said vortex cup;
    a sand diverter adjacently attached to said vortex cup downhole thereof and comprising a sand filtering screen adjacent said vortex cup and a diverter plate adjacently attached to a lower portion of said sand diverter;
    a plurality of slots along a circumference of an upper portion of said vortex housing for entry of fluids and solids;
    wherein said vortex cup comprises an aperture through its central portion, thereby defining a channel with an internal surface which is internally threaded a long portions thereof to threadedly connect said vortex cup to said sand diverter and said production tube, and wherein said vortex cup comprises a plurality of grooves along an outer surface, said grooves extending in a helical pattern downward, said vortex cup being in close communication with said vortex housing, said grooves imparting a vortexing motion to a fluid.

12. The sand separator for use within a wellbore as set forth in claim 11 wherein said sand filtering screen comprises an aperture through its central portion defining a channel with an internal surface with portions thereof comprising internal threads to threadedly connect to said vortex cup, said aperture corresponding to said aperture of said vortex cup, and allowing fluid there through and through and through said vortex cup;

wherein said sand filtering screen comprises a plurality of slots to block sand from entering said aperture; and wherein said diverter plate extends downward from said sand diverter, and defines a channel between said diverter plate and a sidewall of said vortex housing.

13. A system for separating solids and gas from produced fluids within a wellbore comprising:

a sand separation stage comprising:

a vortex cup within a vortex housing attached to a production tube up hole of said vortex cup;

a sand diverter system attached to said vortex cup downhole thereof and comprising a sand filtering screen adjacent said vortex cup and a sand diverter adjacently attached to a lower portion of said sand filtering screen, and defining a channel with a sidewall of said vortex housing;

a plurality of slots along a circumference of an upper portion of said vortex housing for entry of fluids and solids; and a gas separation stage comprising:

a tube plate disposed within a tubing collar and resting along an internal lip thereof, a lower transfer tube extending upward from said tube plate, said lower transfer tube being in fluid communication with an aperture within said tube plate, a gas separator housing receiving said tubing collar along a lower end thereof;

an upper connector comprising a channel which houses a ball and seat valve in communication with a port of said upper connector extending outward into said gas separator housing, an upper transfer tube in fluid communication with an aperture extending through said upper connector and beside said ball and seat valve, and wherein said gas separator housing receives said upper connector.

\* \* \* \* \*